(12) United States Patent
Sauvageot (10) Patent No.: US 9,144,906 B2
(45) Date of Patent: Sep. 29, 2015

(54) ANTI-INTRUSION METHOD IN AN AUTOMATED SYSTEM WITH ROBOT

(71) Applicant: SIDEL PARTICIPATIONS, Octeville sur Mer (FR)

(72) Inventor: Fabrice Sauvageot, Octeville-sur-Mer (FR)

(73) Assignee: C.E.R.M.E.X. CONSTRUCTIONS ETUDES ET RECHERCHES DE MATERIELS POUR L'EMBALLAGE D'EXPEDITION, Corcelles-les-Citeaux (FR)

( * ) Notice: Subject to any disclaimer, the term of this patent is extended or adjusted under 35 U.S.C. 154(b) by 0 days.

(21) Appl. No.: 14/173,382

(22) Filed: Feb. 5, 2014

(65) Prior Publication Data
US 2014/0222203 A1     Aug. 7, 2014

(30) Foreign Application Priority Data

Feb. 5, 2013   (FR) .................................... 13 50966

(51) Int. Cl.
| | |
|---|---|
| *G06F 7/00* | (2006.01) |
| *B25J 9/16* | (2006.01) |
| *B25J 19/06* | (2006.01) |
| *B65G 57/00* | (2006.01) |

(52) U.S. Cl.
CPC .............. *B25J 9/1674* (2013.01); *B25J 9/1676* (2013.01); *B25J 19/06* (2013.01); *B65G 57/00* (2013.01); *B65G 2207/40* (2013.01); *G05B 2219/40202* (2013.01)

(58) Field of Classification Search
CPC .... B25J 9/1676; B65G 61/00; B65G 2207/40
USPC ........... 700/217, 248, 245, 79, 247, 250, 255, 700/258; 348/152; 318/568.11, 568.12, 318/568.16, 568.18, 568.24; 414/788.1, 414/137.1
See application file for complete search history.

(56) References Cited

U.S. PATENT DOCUMENTS

| | | | | |
|---|---|---|---|---|
| 5,280,622 | A | * | 1/1994 | Tino .............................. 700/255 |
| 6,979,814 | B2 | | 12/2005 | Kudo et al. |
| 8,447,426 | B2 | | 5/2013 | Mougin et al. |

(Continued)

FOREIGN PATENT DOCUMENTS

| | | |
|---|---|---|
| EP | 1 331 433 A2 | 7/2003 |
| EP | 2 186 761 A1 | 5/2010 |
| FR | 2 948 339 A1 | 1/2011 |

OTHER PUBLICATIONS

French Search Report for FR 1350966, dated Oct. 2, 2013.

*Primary Examiner* — Dalena Tran
(74) *Attorney, Agent, or Firm* — Sughrue Mion, PLLC (57) ABSTRACT

A method for making use of an automated system with a robot, including the following steps: (i) a management controller (12) authorizes the extraction of a pallet (2) and communicates information to a safety controller (11) concerning the extraction authorization, (ii) a series of presence detectors (7) sends initial height information (HLP) for a pallet (2) on which products (10) are arranged to the safety controller (11), (iii) the safety controller (11) generates reference information based on the initial information received, (iv) the presence detectors (7) send current height information for the pallet (2) to the safety controller (11), and the safety controller (11) compares the current height information to the reference information. If the current information does not correspond to the reference information, then a robot (5) is stopped and/or the safety measures of the enclosure (1) are applied.

7 Claims, 7 Drawing Sheets

(56) References Cited

U.S. PATENT DOCUMENTS

| | | |
|---|---|---|
| 8,908,024 B2 * | 12/2014 | Fedorenko et al. ............ 348/77 |
| 2003/0146373 A1 | 8/2003 | Kudo et al. |
| 2007/0211395 A1 | 9/2007 | Svensson et al. |
| 2010/0125361 A1 | 5/2010 | Mougin et al. |
| 2012/0163953 A1 | 6/2012 | Murano et al. |

\* cited by examiner

ANTI-INTRUSION METHOD IN AN AUTOMATED SYSTEM WITH ROBOT

The invention relates to an anti-intrusion method in an automated system in which a robot is used.

Such a system is described in particular in patent application FR 2948339. For safety reasons, it usually includes an enclosed space where the robot maneuvers and where it stacks products on at least one pallet positioned at a palletizing station.

A door to the palletizing station allows an operator to retrieve the pallet when the pallet is full.

Also usually, the door can be equipped with a sensor strip forming a safety light curtain for the automated system, meaning it at least stops the operation of the robot inside the enclosure (or even completely cuts off power to the system) if the light curtain is obstructed, in particular by the operator or by some other person entering the enclosure through the door. The sensors may be photoelectric cells placed in the enclosure, away from the door and behind the door frame.

Such a system does not ensure optimum safety for the operator.

In fact, the height of the light curtain is predetermined, in particular according to the distance to the robot maneuvering near the door of the enclosure and according to the height of a full pallet loaded with a specific number of layers of products. If, at the end of production, there are not enough products to fill a pallet, a partially full pallet must exit the enclosure. There is then a height difference between the top of the pallet which is supporting the products and the normal height of a full pallet. An operator can enter the enclosure above the partially full pallet without being detected and without triggering the safety features of the enclosure.

The same problem arises if products fall off the pallet after the enclosure door is opened.

The invention overcomes this disadvantage. It is also of interest in cases where a dangerous situation is detected during removal of a full pallet.

It applies to all kinds of enclosures, although it is of particular interest for enclosures in which robots are allowed to work even if the operator enters the enclosure.

The invention therefore relates to a method for making use of an automated system with robot, comprising:
 an enclosure equipped with at least one door providing access to at least one operator intervention station, said at least one operator intervention station being located within a work area of said robot and being adapted to accommodate a pallet,
 a series of presence detection means in alignment along a vertical element of the enclosure, said series of presence detection means being arranged at or near said door, said series of detection means being connected to a safety controller acting on the operation of the robot and/or on the safety measures applied to said enclosure, and communicating with a management controller of the automated system.

The method of the invention is noteworthy in that it comprises the following steps, in this order:
 the management controller authorizes extraction of a pallet and communicates information to the safety controller concerning the extraction authorization,
 said series of detection means sends initial information about the pallet on which products are arranged, to said safety controller,
 said safety controller generates reference information that is based on said initial information received,
 at least at the moment when the pallet is extracted from the operator intervention station and when one end of the pallet is located in front of the series of detection means:
  the detection means send current height information concerning said pallet to said safety controller, and
  said safety controller compares said current height information to said reference information,
 and, if said current height information does not match the reference information, then the robot is stopped and/or the safety measures of said enclosure are applied.

With this system, if an operator attempts entry over the products stored on the pallet, this hazardous intrusion will be detected because the current height information will include the height of the operator attempting entry over the products, and this current height information will be different from the reference information based on the initial information.

It should be understood that the reference information, which is generated by the safety controller from the initial information, does not necessarily correspond to said initial information. The reference information is to be understood as information that is generated from multiple criteria, one of which is the initial information. The reference information may therefore be a range of values or a value to which an algorithm was applied.

In this manner, according to one particular embodiment, the safety controller can assign the same reference information to two initial height information data items sent by two adjacent sensors belonging to the same set of sensors.

According to the invention, in one embodiment which will be described and illustrated below, at the time of pallet extraction the detection means can periodically transmit said current height information, and the controller can compare each received current height information to said reference information.

According to yet another advantageous embodiment, the operation of said series of detection means is tested before a palletizing cycle. This ensures that the detection means are working properly before each pallet extraction. If a malfunction of the detection means is found, then the safety measures for the automated system can be applied before allowing removal of the full pallet.

The test may involve:
 verifying that the detection means are not obscured, and
 obscuring each of said detection means one at a time by passing said robot in front of each one during a predetermined period of time and observing a state change for each of said detection means when obscured by said robot.

The invention further relates to an automated system for implementing the method as defined above, said automated system comprising:
 an enclosure equipped with at least one door providing access to at least one operator intervention station, said at least one operator intervention station being located within said work area of said robot and able to accommodate a pallet,
 a series of presence detection means in alignment along a vertical element of the enclosure, said series of presence detection means (i) being arranged at or near said door, (ii) being connected to a safety controller acting on the operation of the robot and/or on the safety measures applied to said enclosure, and communicating with a palletizing management controller, and (iii) comprising a series of obscurable sensors positioned at regular intervals along at least part of the height of said operator intervention station.

Preferably, the regular intervals are no larger than 400 mm.
More preferably, said series of sensors comprises eight sensors (XX), divided into four sets of two sensors, said sets being spaced equally apart from each other by substantially 400 mm, the two sensors of a same set being spaced apart by a distance of between 50 mm and 200 mm.

Such an embodiment takes into consideration the lifting of a pallet by a pallet truck without triggering the safety measures for the automated system.

The invention is disclosed in a sufficiently clear and complete manner in the following description to enable its implementation, accompanied by drawings in which.

In the following description, the terms "lower", "upper", "top", "bottom", etc. are used in reference to the drawings for better comprehension. They are not to be understood as limitations to the scope of the invention.

Figure 1:
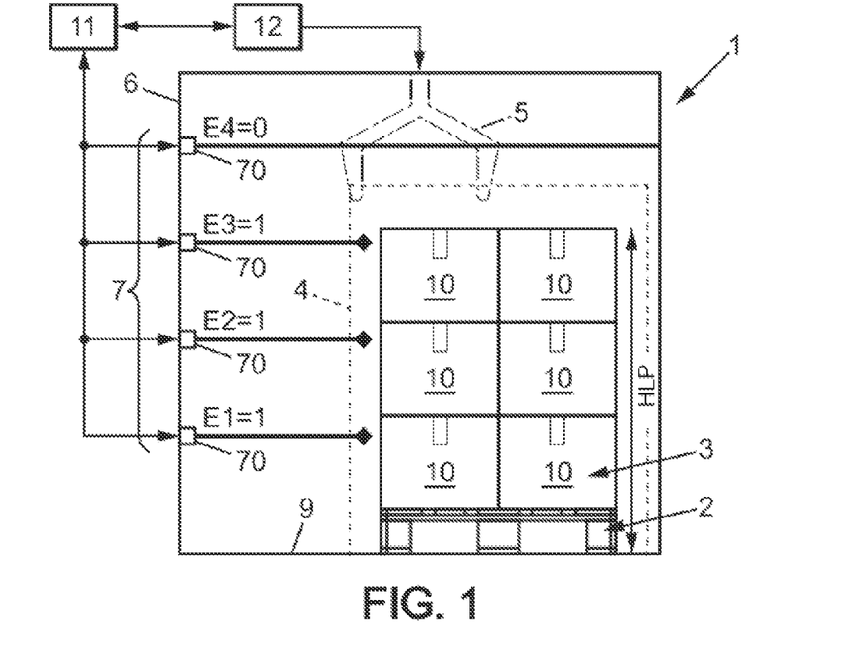
FIG. 1 is a schematic representation, in a front view, of an operator intervention station where there is a full pallet, said station being equipped with monitoring means according to one embodiment of the invention.

In FIG. 1, and in all other figures, a square is used as a very schematic representation of an enclosure 1. Imagine the enclosure as being an enclosed space, for example such as the one described in patent application FR 2948339, which comprises a palletizing station, a robot 5 that captures products 10 on a feed belt ending inside the chamber and that deposits the products on a pallet 2 located inside the palletizing station.

The palletizing station partially contains an operator intervention station 3, meaning a geographical area in which an operator can intervene, particularly in order to extract a full pallet 2, meaning a pallet on which products are arranged in a predetermined number of layers. The operator intervention area 3, as it is at least partially within the palletizing area (an area where the robot works 5), is therefore also within a work area of the robot 5.

The enclosure 1 may also include a door, which can be a physical or a non-physical barrier and which provides access to the operator intervention station.

To simplify the figures, a door 4 has been schematically represented with dotted lines in FIG. 1 only, and the robot 5 by a gripper arm represented with dots and dashes.

The enclosure 1 comprises, on a vertical post 6, a series of presence detection means 7. The presence detection means 7 are conventional optical sensors 70, each of which change from a detected state (En=1) to an undetected state (En=0) when it is respectively obscured or not obscured.

"En" is to be understood as corresponding to the detection state of the nth sensor 70 in the series of presence detection means 7.

For example, for the first sensor 70, its detection state is denoted E1 in the figures. If E1=1, this means that the first sensor is obscured. In other words, the sensor has detected the presence of a product 3 or something else.

In FIGS. 1 to 4b, the series of detection means 7 comprises four optical sensors 70 which are distributed at an equal distance from each other. Said distance is at most 400 mm.

More precisely, the sensors 70 are installed vertically every 400 mm, from the ground 9 to a height of 1600 mm.

However, the invention is not limited to the use of optical sensors 70 only, as the presence detection means 7 may comprise other types of sensors such as ultrasonic sensors, infrared sensors, etc.

The invention is also not limited to the presence of only four sensors: in FIGS. 5a to 8b, the system comprises eight optical sensors 70, in pairs uniformly distributed along the post 6.

In such an embodiment, "En" corresponds to the state of an nth group of two sensors 70. Each upper sensor 70 of a sensor group 70 has a state indicated as A, while the lower sensor 70 of each sensor group 70 has a state indicated as B.

As the figure indicates E4 A=0 and B=0, this means that in the fourth group of sensors 70, the two upper and lower sensors are both not obscured.

The groups of two sensors 70 are spaced 400 mm apart, and in a same group of two optical sensors 70, the two sensors 70 are spaced apart by a distance of between 50 and 200 mm. In this particular embodiment, the space is 50 mm, which substantially corresponds to the height of the pallet 2 when lifted by a pallet truck 8 for extraction.

As can be seen in the figures, the series of presence detection means 7 is positioned by the door 4 of the enclosure 1, in the operator intervention area 3.

The principle of the invention consists of measuring the height of the palletized load (meaning the assembly consisting of the products 10 arranged in layers on the pallet 2) using optical sensors 70.

In both the first example shown in FIGS. 1 to 4b, and the second example shown in FIGS. 5a to 8b, the series of presence detection means 7 is connected to a safety controller 11.

The safety controller 11 communicates with a management controller 12 of the automated system, the management controller 12 and the safety controller 11 acting directly or indirectly on the operation of the robot and/or on the safety measures applied to said enclosure, meaning completely shutting off power to the enclosure which results in an emergency shutdown of the robot during its operation.

We will now focus on the operation of the invention while referring to each of the figures and the different situations they illustrate.

In FIG. 1, a height HLP is indicated, corresponding to the Height of the Load added to that of the Pallet.

In a first step, the management controller 12 of the automated system authorizes extraction of a pallet and communicates information to the safety controller 11 concerning the fact that it has authorized extraction of the pallet.

Following this step, the opening of the door 4 is requested, and the state of the four sensors 70 is stored. For the example illustrated in FIG. 1, initial information $C_0$ about the pallet is obtained which corresponds to the 4-tuple $C_0=(1, 1, 1, 0)$, and this is sent to the safety controller 11.

Upon receipt of this initial information $C_0$, the safety controller 11 assigns reference information which corresponds to the result obtained after applying some criteria to the initial information received $C_0$.

This configuration is then monitored during the extraction of the pallet 2. This provides warning of two issues shown in FIGS. 2 and 3. In the example shown in FIG. 2, where an operator 13 is attempting to climb onto the load of products 10 on the pallet 2, the 4-tuple changes from $C_0=(1, 1, 1, 0)$ to $C_1=(1, 1, 1, 1)$ The 4-tuple $C_1=(1, 1, 1, 1)$ corresponds to a current information point $C_1$.

Figure 2:
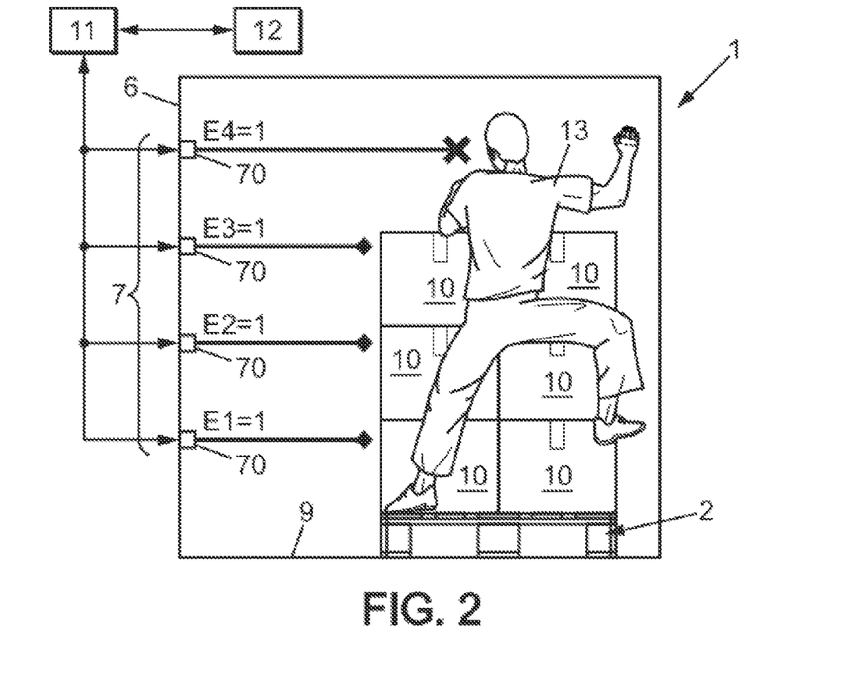
FIG. 2 shows the intervention station of FIG. 1, with an operator attempting to climb over the full pallet.

The safety controller 11 compares the received current information point $C_1$ to the reference information that it has saved and which is a function of the information originally received $C_0$ (possibly after applying criteria to the current information point $C_1$).

After comparison, as the two sets of information do not match, fault information is generated by the safety controller 11 which stops the robot and applies the security measures of the automated system.

Figure 3:
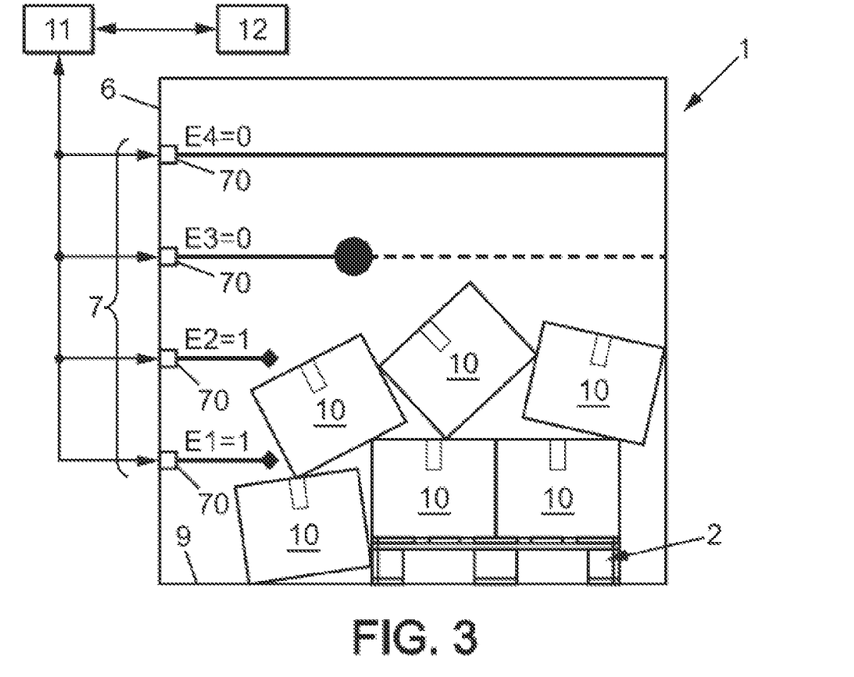
FIG. 3 shows the intervention station of FIG. 1, where the products stored on the pallet have fallen after the door of the intervention station has been opened.

In the case illustrated in FIG. 3, the change from the 4-tuple $C_0=(1, 1, 1, 0)$ to the 4-tuple $C_1=(1, 1, 0, 0)$ also generates fault information which leads to stopping the robot and/or applying the security measures of the automated system.

In these two simplified cases, any change of configuration generates fault information if the pallet is present, and then if one (or more) additional sensor(s) is obscured, synonymous with intrusion, this generate(s) fault information if the pallet is no longer present. Removal of the pallet from the light curtain area (the series of presence detection means 7) thus does not trigger inappropriate fault detection information.

The second embodiment shown in FIGS. 5a to 8b is of interest in view of the first embodiment, which although functional may trigger an inappropriate shutdown because it is possible for the pallet truck 8 to obscure a sensor when lifting a pallet 2.

Figure 4A:
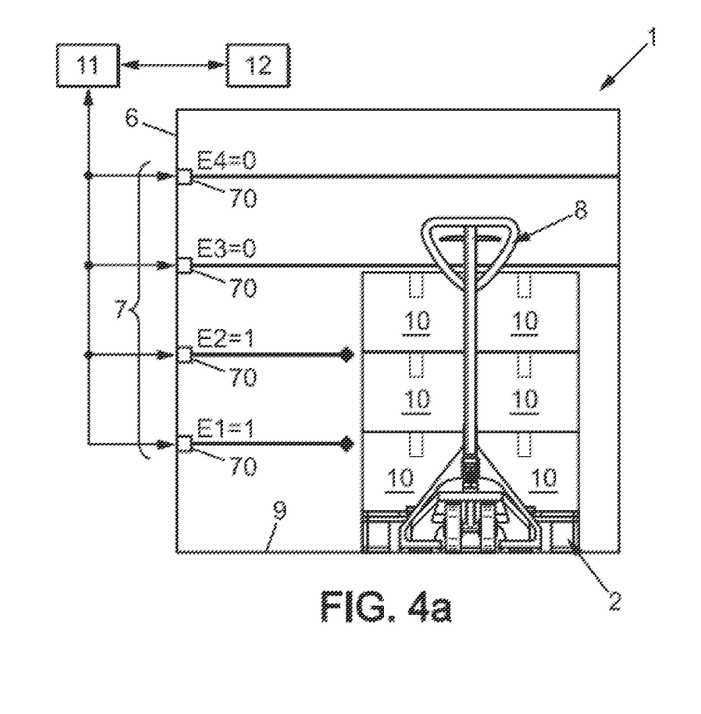
FIGS. 4a and 4b show the intervention station of FIG. 1 with a full pallet having a certain height, before the pallet is picked up by the pallet truck (FIG. 4a) and after the pallet is picked up by the pallet truck (FIG. 4b)
Figure 4B:
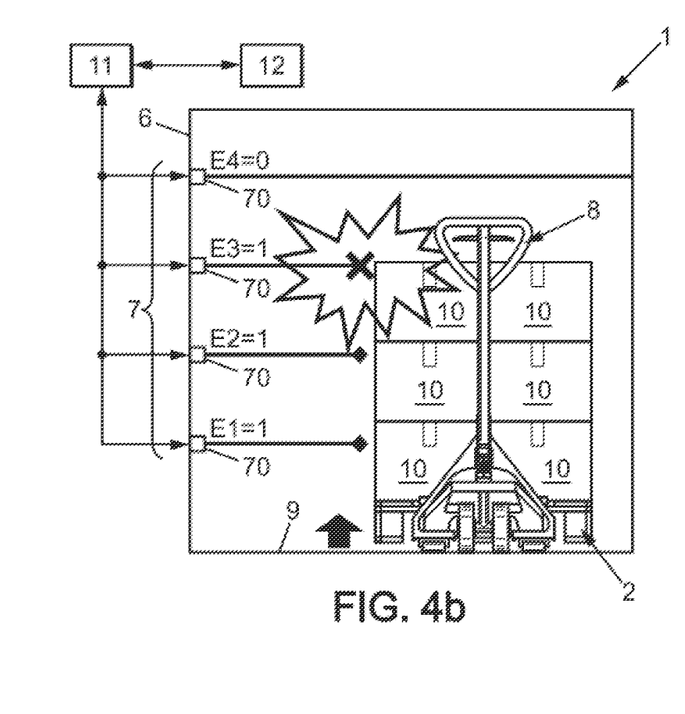

FIGS. 4a and 4b show the change from the 4-tuple $C_0=4(1, 1, 0, 0)$ to the 4-tuple $C_1=(1, 1, 1, 0)$, which results in the generation of fault information and robot shutdown.

To further improve the method according to the invention, four groups of two sensors 70 can replace the four sensors 70 shown in FIGS. 1 to 4b.

It is then possible to distinguish the case of an actual intrusion from the extreme case where the lifting action of the pallet truck 8 activates the sensor 70.

Figure 5A:
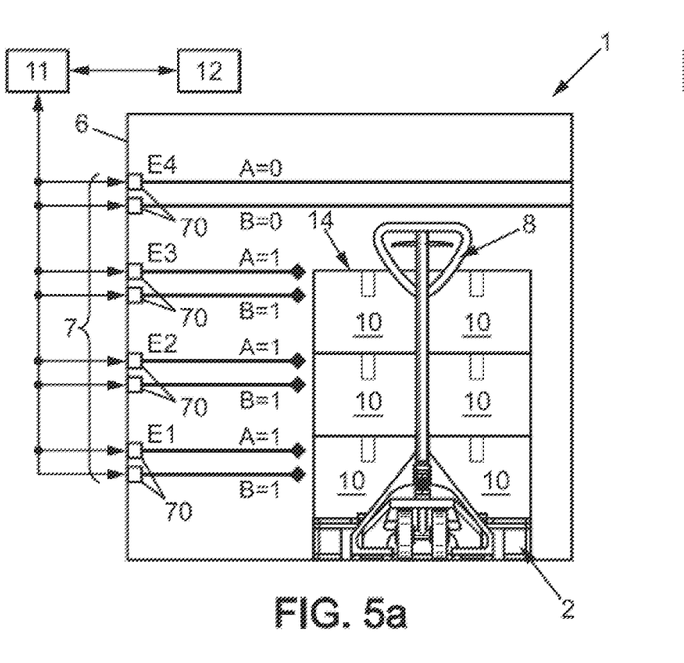
FIGS. 5a and 5b show the intervention station of FIG. 1 with a full pallet having a second height, before the pallet is picked up by the pallet truck (FIG. 5a) and after the pallet is picked up by the pallet truck (FIG. 5b)
Figure 5B:
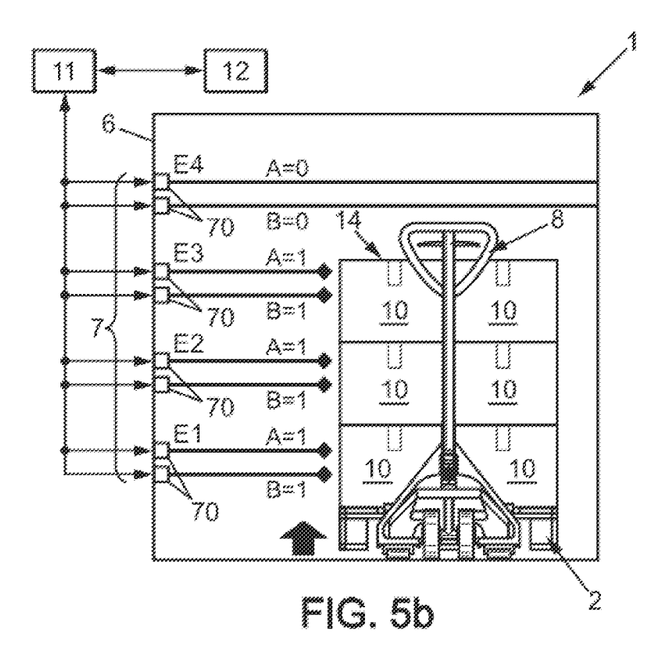

In the example shown in FIGS. 5a and 5b, before the pallet 2 is lifted, the upper surface 14 of the loaded products 10 is substantially at the same level as the upper sensor of the third group. Thus, before the pallet 2 is lifted by the pallet truck 8 (FIG. 5a), both sensors A and B of the third group have the same obscured state (A=1 and B=1 for E3). After the pallet 2 is lifted by the pallet truck 8 (FIG. 5b), the sensors A and B of the third group still have the same obscured state (A=1 and B=1 for E3) because the surface 14 is still above the upper sensor 70 of the third group. There is therefore no inappropriate shutdown of the automated system with robot.

Figure 7A:
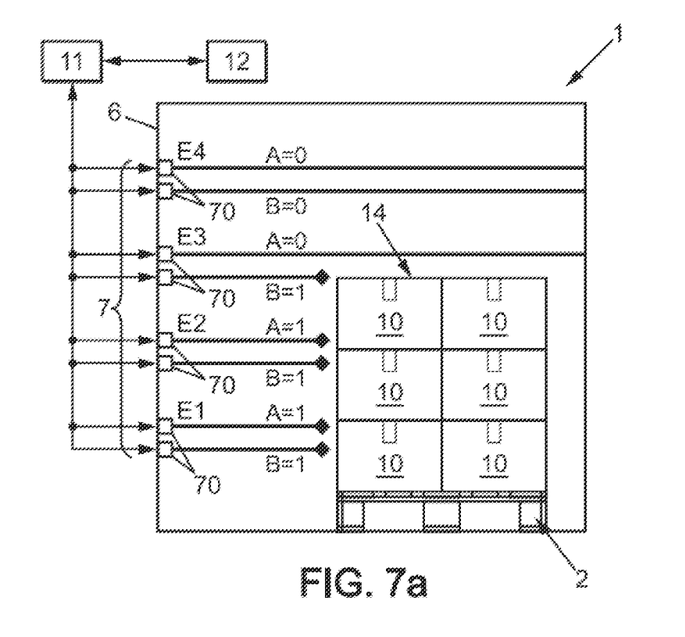
FIGS. 7a and 7b show the intervention station of FIG. 1 with a full pallet having a fourth height, before the pallet is picked up by the pallet truck (FIG. 7a) and after the pallet is picked up by the pallet truck (FIG. 7b)
Figure 7B:
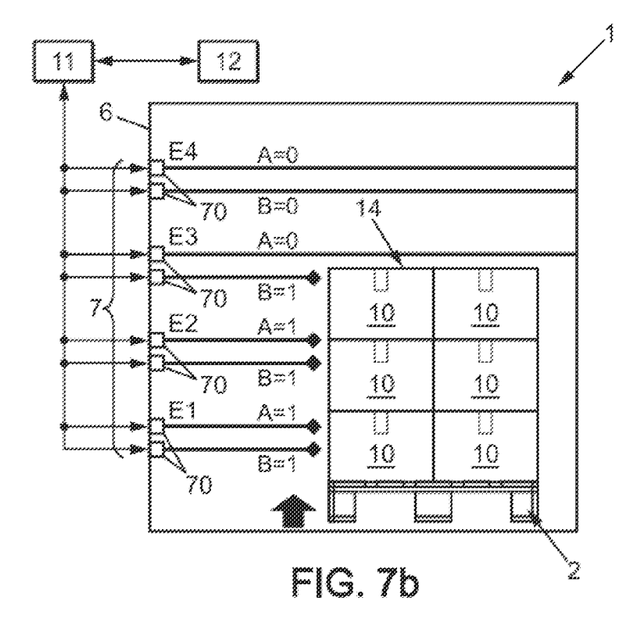

The same applies for the example shown in FIGS. 7a and 7b. In FIG. 7a, note that that the upper surface 14 of the products 10 loaded on the pallet 2 is substantially at the same level as the lower sensor 70 in the third group of sensors 70: thus, before the pallet 2 is lifted, the lower sensor 70 in the third group of sensors is already obscured before lifting (for the E3 group, A=0, B=1). After the pallet 2 is lifted, the upper surface 14 is still at a level between the lower sensor 70 and the upper sensor 70 of the third group of sensors 70. Thus, the lower sensor 70 in the third group remains obscured while the upper sensor 70 remains not obscured (for the third group E3 of sensors 70, A=0 and B=1) (FIG. 7b).

The two examples illustrated in FIGS. 5a, 5b, 7a and 7b do not always correspond to the situations encountered, however.

Figure 6A:
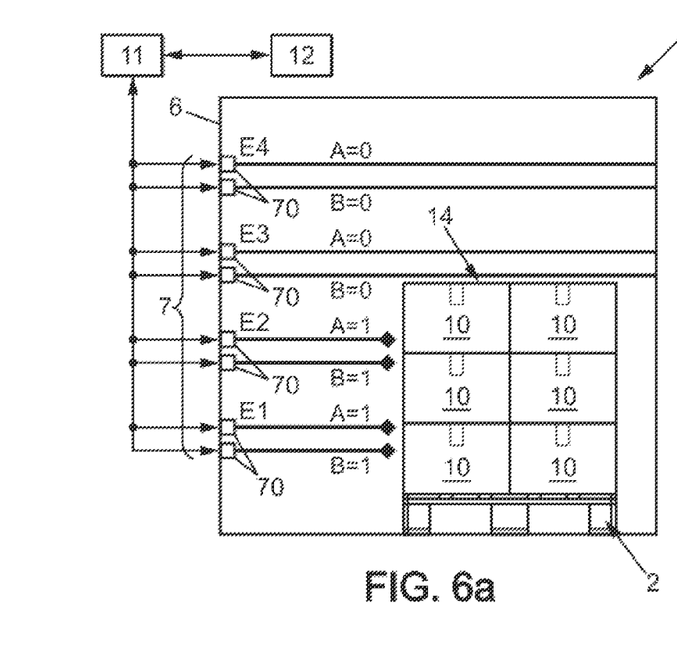
FIGS. 6a and 6b show the intervention station of FIG. 1 with a full pallet having a third height, before the pallet is picked up by the pallet truck (FIG. 6a) and after the pallet is picked up by the pallet truck (FIG. 6b)
Figure 6B:
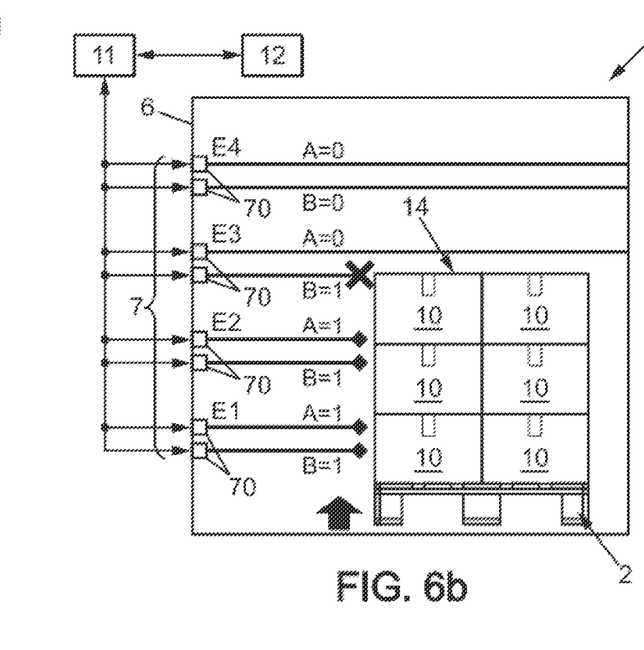

For example, in the example illustrated in FIGS. 6a and 6b, the states of the two sensors 70 before and after the pallet 2 is lifted by the pallet truck 8 are not the same.

In the example shown in FIG. 6, the upper surface 14 of the products 10 is just below the lower sensor 70 of the third group. Before the pallet is lifted (FIG. 6a), the sensors A and B of the third group are therefore not obscured (E3, A=0 and B=0), but after lifting (FIG. 6b), sensor B is obscured (E3, A=0 and B=1) because the upper surface 14 of the products 10 is at a level between the levels of the two sensors of the third group 70 (FIG. 8b).

Figure 8A:
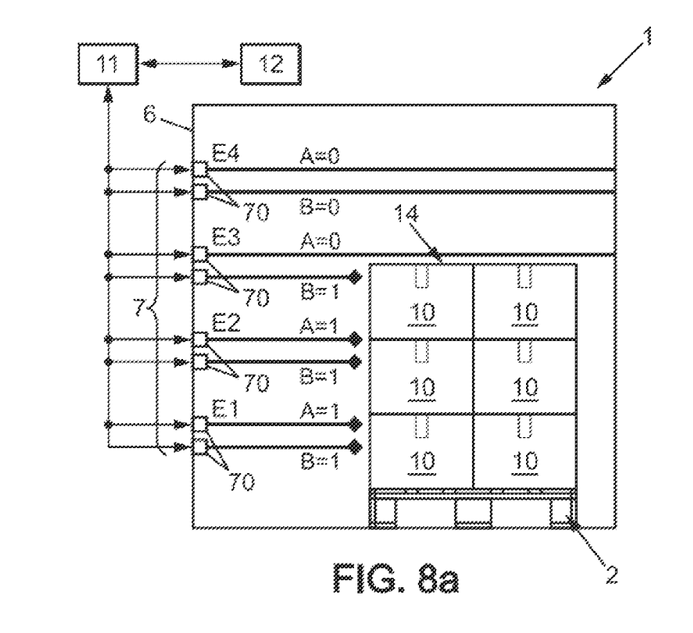
FIGS. 8a and 8b show the intervention station of FIG. 1 with a full pallet having a certain height, before the pallet is picked up by the pallet truck (FIG. 8a) and after the pallet is picked up by the pallet truck (FIG. 8b).
Figure 8B:
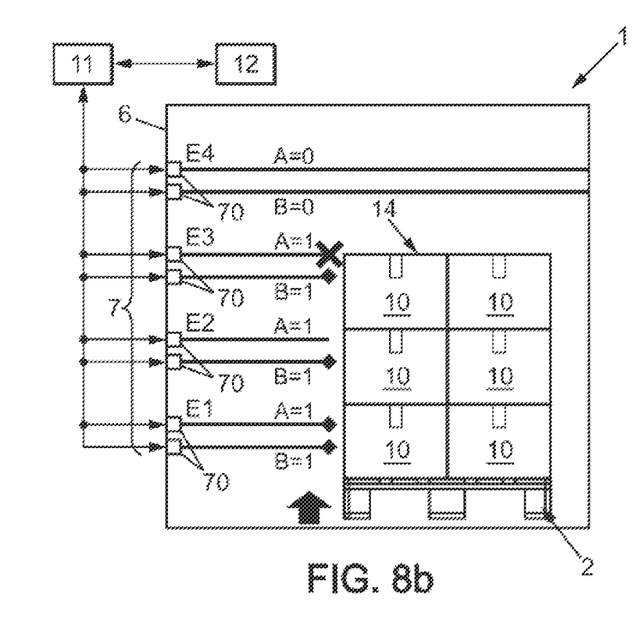

The same applies to the examples shown in FIGS. 8a and 8b: the upper surface 14 of the products 10 is located, before the pallet 2 is lifted, at a level between the levels of the sensors 70 of the third group, but close to the level of the upper sensor 70. Thus, before lifting the pallet 2 (FIG. 8a), the lower sensor of the third group is obscured but the upper sensor of the third group is not (E3, A=0 and B=1). But after lifting the pallet 2, the surface 14 is at a higher level than the upper sensor 70 of the third group: the state of this sensor therefore changes (see FIGS. 8b: E3, A=1 and B=1).

To avoid inappropriately stopping the automated system in these cases, the reference information which is attributed by the safety controller 11 at a height HLP which is slightly less than the height of the position of the lower or upper sensor of a sensor group 70, is the same as the information given when the height HLP reaches a higher level: this avoids intrusion detection due to the sensor 70 (in the same group) immediately above the one that detected the height HLP.

Thus, the reference information generated by the safety controller in the context of the example shown in FIG. 6a is the same as the information which would have been attributed in the example in FIG. 6b. The same applies for the example illustrated in FIGS. 8a and 8b.

To ensure proper operation of the invention, the functional status of each sensor 70 of the presence detection means 7 is verified before each pallet extraction.

In other words, the operation of the series of detection means is tested before authorizing the opening of the door 4 of the enclosure 1.

To do this, the robot 5 is used to verify that each sensor 70 changes from one state to another when the robot passes in front of it.

Specifically, first each sensor is checked to ensure it is not in an obscured state (all sensors must be in state "0").

Then, each sensor 70 is obscured by passing part of the robot in front of it, and each time the part of the robot passes in front of the sensor is it observed whether the sensor changes state from "0" to "1".

If no change of state is observed then the sensor is defective, and the safety measures for the enclosure are automatically applied by the safety controller 11 and fault information is sent to the line management controller 12.

The method according to the invention will resume automatically once each sensor passes the function test, before the next extraction of a pallet after replacement of the sensor.

From the above description, it is clear that the invention provides additional safety for operators during pallet extraction.

It should be understood, however, that the invention is not limited to the embodiments specifically described above and that it applies to the use of any equivalent means.

The invention claimed is:

1. A method of making use of an automated system with a robot in an enclosure equipped with at least one door providing access to at least one operator intervention station, said at least one operator intervention station being located within a work area of a robot and being adapted to accommodate a pallet, and a series of detecting means for detecting a presence in alignment along a vertical element of the enclosure, said series of detecting means being arranged at or near said door, said series of detecting means being connected to a safety controller acting on an operation of the robot and/or on safety measures applied to said enclosure, and communicating with a management controller of the automated system:
wherein according to the method:
said management controller authorizes extraction of a pallet and communicates information to the safety controller concerning the extraction authorization,
said series of detecting means sends initial height information about the pallet on which products are arranged to said safety controller,
said safety controller generates reference information that is based on said initial height information received,
at least at the moment when the pallet is extracted from the operator intervention station and when one end of the pallet is located in front of the series of detector means:
the detector means sends current height information concerning said pallet to said safety controller, and
said safety controller compares said current height information to said reference information; and
wherein, if said current height information does not match the reference information, then the robot is stopped and/or the safety measures of said enclosure are applied.

2. The method according to claim 1, wherein, at the time of pallet extraction, the detector means periodically transmits said current height information, and wherein said controller compares each received current height information to said reference information.

3. The method according to claim 1, wherein said safety controller assigns the same reference information to two initial height information items sent by two neighboring sensors belonging to a same set of sensors, such that a single reference information is generated based on the two neighboring sensors.

4. The method according to claim 1, wherein an operation of said series of detector means is tested before a palletizing cycle.

5. The method according to claim 4, wherein said test operation comprises:
verifying that the detector means are not obscured,
obscuring each of said detector means one at a time by passing at least a part of said robot in front of each one during a predetermined period of time and observing a state change for each of said detector means when obscured by said robot.

6. An automated system for implementing the method according to claim 1, said automated system comprising:
the enclosure equipped with at least one door providing access to at least one operator intervention station, said at least one operator intervention station being located within said work area of a robot and being able to accommodate a pallet, and
the series of detector means in alignment along a vertical element of the enclosure, said series of detector means:
(i) being arranged at or near said door,
(ii) being connected to a safety controller acting on the operation of the robot and/or on the safety measures applied to said enclosure, and communicating with a palletizing management controller, and
(iii) comprising a series of obscurable sensors positioned at regular intervals along at least part of a height of said operator intervention station; and
said regular intervals being no larger than 400 mm.

7. The automated system according to claim 6, wherein said series of sensors comprises eight sensors, divided into four sets of two sensors, said sets being spaced equally apart from each other by substantially 400 mm, the two sensors of a same set being spaced apart by a distance of between 50 mm and 200 mm.

* * * * *